United States Patent
Purz et al.

(10) Patent No.: US 11,104,304 B2
(45) Date of Patent: *Aug. 31, 2021

(54) WIPER ARM DEVICE TO CLEAN A VEHICLE WINDSHIELD AND USE OF THE WIPER ARM DEVICE

(71) Applicant: Valeo Wischersysteme GmbH, Bietigheim-Bissingen (DE)

(72) Inventors: Matthias Purz, Bietigheim-Bissingen (FR); Wolfgang Scholl, Bietigheim-Bissingen (FR)

(73) Assignee: Valeo Wischersysteme GmbH, Bietigheim-Bissingen (DE)

( * ) Notice: Subject to any disclaimer, the term of this patent is extended or adjusted under 35 U.S.C. 154(b) by 330 days.

This patent is subject to a terminal disclaimer.

(21) Appl. No.: 16/225,779

(22) Filed: Dec. 19, 2018

(65) Prior Publication Data
US 2019/0193685 A1    Jun. 27, 2019

(30) Foreign Application Priority Data
Dec. 21, 2017 (DE) .......................... 102017130938.1

(51) Int. Cl.
*B60S 1/34* (2006.01)
*B60S 1/38* (2006.01)

(52) U.S. Cl.
CPC .............. *B60S 1/3486* (2013.01); *B60S 1/34* (2013.01); *B60S 1/3402* (2013.01); *B60S 1/3431* (2013.01); *B60S 1/345* (2013.01); *B60S 1/3409* (2013.01); *B60S 2001/3824* (2013.01)

(58) Field of Classification Search
CPC ........ B60S 1/3486; B60S 1/34; B60S 1/3402; B60S 1/3431; B60S 1/3409; B60S 2001/3824; B60S 1/345

USPC ........................ 15/250.352, 250.351, 250.37
See application file for complete search history.

(56) References Cited

U.S. PATENT DOCUMENTS 2,613,385 A * 10/1952 Wylie ..................... B60S 1/524
15/250.351

FOREIGN PATENT DOCUMENTS

| DE | 19747797 A1 | 5/1999 |
| DE | 19816210 A1 | 10/1999 |
| DE | 102005015038 A1 | 10/2006 |
| GB | 754788 A | 8/1956 |

(Continued)

OTHER PUBLICATIONS

Machine language translation of description portion of German publication 102005015038, published Oct. 2006. (Year: 2006).*

(Continued)

*Primary Examiner* — Gary K. Graham
(74) *Attorney, Agent, or Firm* — Osha Bergman Watanabe & Burton LLP

(57) ABSTRACT

The invention relates to a wiper arm device (100) for cleaning a vehicle window (1), with a wiper arm head (10) that can be at least indirectly connected by means of a wiper arm rod (22) with a wiper blade (5) at a first end region with a drive shaft (12) and a second end region lying opposite the first end region, wherein the wiper arm rod (22) is pivotably mounted on the side facing the wiper arm head (10) in a first pivoting axis (20). It is provided according to the invention that a spacer device (40) is arranged on the wiper arm rod (22), and designed to hold the wiper arm rod (22) a constant distance (a) away from the vehicle window (1).

7 Claims, 1 Drawing Sheet

(56) References Cited

FOREIGN PATENT DOCUMENTS

Figure 1:
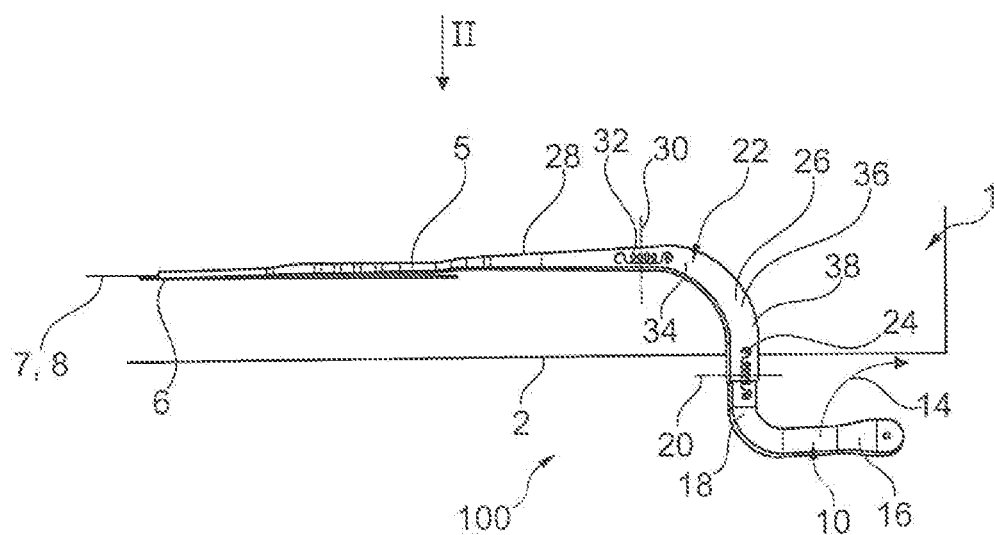

GB          853516     * 11/1960
WO        9104887 A1    4/1991

OTHER PUBLICATIONS

Search Report issued in corresponding German Patent Application No. 10 2017 130 938.1, dated Nov. 30, 2018 (8 pages).
Communication from the Examining Division in corresponding German Application No. 18 214 460.0-1015, dated May 13, 2020 (5 pages).

* cited by examiner

WIPER ARM DEVICE TO CLEAN A VEHICLE WINDSHIELD AND USE OF THE WIPER ARM DEVICE

PRIOR ART

The invention relates to a wiper arm device for cleaning a vehicle window according to the precharacterizing clause of claim 1, and to the use of a wiper arm device according to the invention.

A wiper arm device for cleaning a vehicle window having the features of the precharacterizing clause of claim 1 is already known from practice and serves to clean a spherically curved vehicle window, in particular a vehicle window of a commercial vehicle. It is necessary here that, while the wiper blade is sweeping over the vehicle window, the wiper blade bears with its wiper rubber in a defined position with respect to the vehicle window in order to achieve an optimum wiping result. The said position is distinguished by as perpendicular an orientation as possible of the wiper blade longitudinal plane with respect to the vehicle window. In order to maintain the said defined position as precisely as possible, the known wiper arm device has a wiper arm head which is coupled to a wiper arm rod in the region of a first pivoting axis. The wiper arm rod in turn carries the wiper blade or the wiper rubber at least indirectly on the side which faces away from the wiper arm head.

In addition to the exact positioning and/or orientation of the described wiper blade plane with respect to the vehicle window, it is necessary, moreover, to maintain a spacing which is as constant as possible between the wiper arm rod and the vehicle window. The constant spacing is desirable, in order to press the wiper blade against the vehicle window with a pressing force which is at least approximately constant, with the result that not only an optimum wiping result is achieved, but rather, moreover, the development of noise of the wiper blade is also minimized during its movement along the vehicle window.

DISCLOSURE OF THE INVENTION

The wiper arm device according to the invention for cleaning a vehicle window having the features of claim 1 has the advantage that it makes it possible to achieve a constant pressing force of the wiper blade on the vehicle window in a particularly simple way. According to the invention, the wiper arm device to this end provides that a spacer device is arranged on the wiper arm rod, which spacer device holds the wiper arm rod at a constant spacing from the vehicle window. Here, the spacer device according to the invention is configured, in particular, in such a way that it bears against the vehicle window and, via its geometry, sets the provided defined spacing from the vehicle window.

Advantageous developments of the wiper arm device according to the invention for cleaning a vehicle window are indicated in the subclaims. All combinations of at least two of the features which are disclosed in the claims, the description and/or the figures fall within the scope of the invention.

In order to minimize the wear between the spacer device and the vehicle window and at the same time to make contact with as low a friction as possible between the spacer device and the vehicle window possible, it is provided in one preferred structural refinement of the spacer device that it has a rotatably mounted roller element or ball element for abutment against the vehicle window on the side which lies opposite the wiper arm rod. The said roller element or ball element therefore rolls on the vehicle window during the movement of the wiper arm rod, it being possible, for example, for it to be provided that the roller element consists of a wear-resistant plastic material in the region of its running face, which also contributes to the minimization of noise.

It is provided in one very particularly preferred structural refinement of the wiper arm device which makes particularly satisfactory orientation and/or positioning of the wiper blade with respect to the vehicle window possible that the wiper arm rod consists of two elements, a first element connected with the wiper arm head and a second element that can be connected at least indirectly with the wiper blade, the two elements being arranged so that they can be moved relative to each other in a second pivoting axis, wherein the second pivoting axis is arranged at least essentially perpendicular to a first pivoting axis between the wiper arm head and the wiper arm rod, and the spacer device being arranged on the first element.

In order to generate the pressing force of the wiper blade on the vehicle window, which pressing force is as constant as possible, it is provided in the case of the last-described structural refinement of the wiper arm rod with two elements that at least a respective one spring element is arranged in the area of the two pivoting axes, wherein the first spring element between the wiper arm head and the wiper arm rod is designed to exert a first pressing force on the first element of the wiper arm rod facing the wiper arm head towards the vehicle window, and wherein the at least one second spring element arranged between the two elements of the wiper arm rod is designed to exert a second pressing force on the wiper blade acting towards the vehicle window.

A further structural refinement of the wiper arm rod which has proven optimum with regard to vehicle windows of spherically curved configuration provides that the wiper arm rod is curved in design, wherein the second element facing the wiper blade is straight in design, and aligned flush with a wiper blade longitudinal direction, and wherein a section of the first element of the wiper arm rod connected with the wiper arm head is essentially arranged perpendicular to the second element of the wiper arm rod.

It is provided in one preferred geometric refinement of the last-mentioned proposal that a section of the first element of the wiper arm rod connected with the second element of the wiper arm rod in the area of the second pivoting axis is aligned with the second element of the wiper arm rod, and that the first element of the wiper arm rod has an area curved by about 90°.

Furthermore, it is preferably provided that the wiper arm head is also curved in design with an area of curvature of at least about 90°, and wherein a section of the wiper arm head that can be connected with a drive shaft for driving the wiper arm head is arranged at least essentially parallel to the second element of the wiper arm rod.

Furthermore, the invention also comprises the use of a wiper arm device according to the invention as described up to this point for spherically curved vehicle windows, in particular in commercial vehicles.

Figure 2:
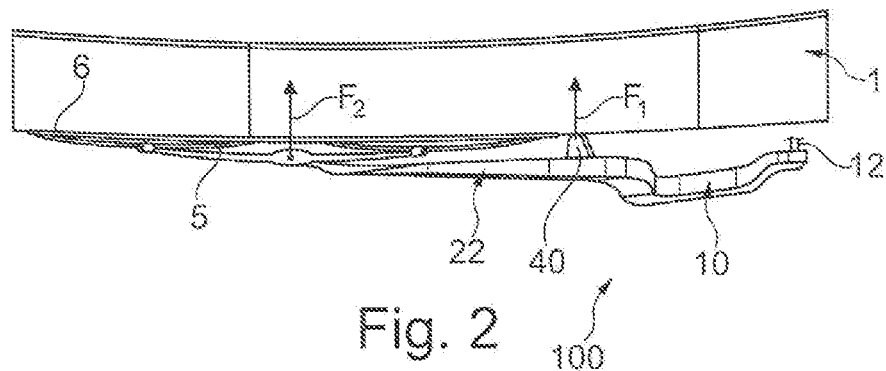
Figure 3:
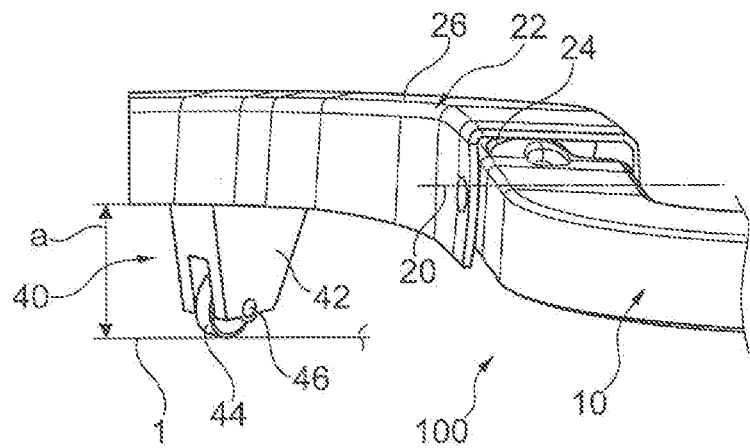

Further advantages, features and details of the invention result from the following description of preferred exemplary embodiments and using the drawing, in which:

FIG. 1 shows a front view of a wiper arm device in the region of a spherically curved vehicle window, FIG. 2 shows the wiper arm device in accordance with FIG. 1 in the direction of the arrow II of FIG. 1, and FIG. 3 shows the connecting region between the wiper arm head and the wiper arm rod of the wiper arm device with a spacer device which is connected to the wiper arm rod, in a perspective view.

Identical elements and/or elements of an identical function are provided with the same reference numerals in the figures.

The wiper arm device 100 which is shown in the figures serves to clean a spherically curved vehicle window 1, also called a panorama window, as is also used to reduce the air resistance of the vehicle, in particular, in the case of commercial vehicles such as lorries or omnibuses.

The wiper arm device 100 has a wiper arm head 10 which can be pivoted in an end region at least indirectly by a wiper motor by means of a drive shaft 12 (not shown in detail) which is connected fixedly to the wiper arm head 10 so as to rotate with it, from the rest position which is shown in FIG. 1 in the direction of the arrow 14, for example by 90°, in order to clean the vehicle window 1.

The external shape of the wiper arm head 10 is of curved configuration with a first section 16 which is oriented approximately parallel to a lower edge 2 of the vehicle window 1 in the rest position which is shown in FIG. 1, and with a second section 18 which is arranged at least approximately at 90° with respect to the first section 16. On that side of the second section 18 which lies opposite the first section 16, the wiper arm head 10 is connected in the region of a first pivoting axis 20 to a wiper arm rod 22.

Both the wiper arm head 10 and the wiper arm rod 22 are usually of U-shaped configuration in cross section at least in regions, in particular in the region of the first pivoting axis 20. At least one first spring element 24 is arranged in the receiving space which is configured as a result between the wiper arm head 10 and the wiper arm rod 22, which first spring element 24 loads the wiper arm rod 22 with a first pressing force $F_1$ in the direction of the vehicle window 1.

The wiper arm rod 22 consists of two elements 26, 28 which are connected to one another in the region of a second pivoting axis 30. It is essential here that the second pivoting axis 30 is arranged offset or rotated at least approximately by 90° with respect to the first pivoting axis 20, the two pivoting axes 20, 30 running at least approximately roughly parallel to the vehicle window 1 or parallel to the plane of the wiper arm head 10 and the wiper arm rod 22. Moreover, at least one second spring element 32 is provided in the connecting region between the two elements 26, 28 of the wiper arm rod 22, which second spring element 32 loads the second element 28 of the wiper arm rod 22 with a second pressing force $F_2$ in the direction of the vehicle window 1.

Whereas the outer shape of the second element 28 of the wiper arm rod 22 is of rectilinear configuration, the first element 26 has a first section 34 which is likewise of rectilinear configuration and is aligned with the longitudinal direction of the second element 28. The first section 34 merges via a curved section 36 into a second section 38 which is connected to the wiper arm head 10. An angle of at least approximately 90° is configured between the two sections 34, 38 of the wiper arm rod 22.

A wiper blade 5 with a wiper rubber 6 for bearing against the vehicle window 1 is arranged on the second element 28 of the wiper arm rod 22. Here, a wiper blade longitudinal direction 7 is arranged at least substantially parallel to the second element 28 of the wiper arm rod 22, and the wiper blade plane 8 which is arranged perpendicularly with respect to the plane of the drawing of FIG. 1 and intersects the wiper blade longitudinal direction 7 runs perpendicularly with respect to the vehicle window 1 in the bearing region of the wiper blade 5 against the vehicle window 1.

In order to always make a constant spacing of the wiper arm rod 22 from the vehicle window 1 possible during sweeping of the wiper blade 5 along the vehicle window 1, in order, in particular, that the second pressing force $F_2$ is also always as constant as possible, the wiper arm rod 22 has a spacer device 40 in the region of the first element 26 of the wiper arm rod 22. The spacer device 40 which can be seen in FIGS. 2 and 3 comprises a spacer element 42 which is arranged on that side of the first element 26 which faces the vehicle window 1, and which serves to fasten and/or mount a roller element 44 which is mounted rotatably in a rotational axis 46 of the spacer element 42. The spacing a between the first element 26 of the wiper arm rod 22 and the vehicle window 1 is therefore formed between the running face or the contact point of the roller element 44 on the vehicle window 1 and the underside of the first element 26 of the wiper arm rod 22.

The wiper arm device 100 which has been described up to now can be altered or modified in a wide variety of ways, without deviating from the concept of the invention. It is also conceivable, in particular, to equip the spacer device 40 with a sliding element instead of a roller element 44, that is to say an element which is arranged rigidly on the spacer device 40 and preferably has a low friction on the section which is in contact with the vehicle window 1.

LIST OF REFERENCE NUMERALS

1 Vehicle window
2 Lower edge
5 Wiper blade
6 Wiper rubber
7 Wiper blade longitudinal direction
8 Wiper blade plane
10 Wiper arm head
12 Drive shaft
14 Arrow
16 1st section
18 2nd section
20 1st pivoting axis
22 Wiper arm rod
24 1st spring element
26 1st element
28 2nd element
30 2nd pivoting axis
32 2nd spring element
34 1st section
36 Curved section
38 2nd section
40 Spacer device
42 Spacer element
44 Roller element
45 Rotational axis
100 Wiper arm device
$F_1$ 1st pressing force
$F_2$ 2nd pressing force
a Spacing

The invention claimed is:

1. A wiper arm arrangement for cleaning a vehicle window, comprising:
a wiper arm head that is at least indirectly connected by a wiper arm rod with an elongated wiper blade at a first end region and with a drive shaft at a second end region lying opposite the first end region, wherein the wiper arm rod is pivotably mounted on a side facing the wiper arm head in a first pivoting axis, wherein a spacer device is arranged on the wiper arm rod, and holds the wiper arm rod a constant distance away from the vehicle window, wherein the wiper arm rod consists of two elements, a first element connected with the wiper arm head and a second elongated element that can be connected at least indirectly with the wiper blade, wherein the two elements are arranged so that they can pivot relative to each other in a second pivoting axis, and wherein the second pivoting axis is arranged essentially perpendicular to the first pivoting axis, and that the spacer device is arranged on the first element, and wherein the wiper blade elongation is substantially parallel to the second element elongation.

2. The wiper arm arrangement according to claim 1, wherein a side of the spacer device facing away from the wiper arm rod has a rotatably mounted roller element or ball element for abutment against the vehicle window.

3. The wiper arm arrangement according to claim 1, wherein:

at least a respective one spring element is arranged in an area of the two pivoting axes, wherein the respective spring elements include at least one first spring element arranged between the wiper arm head and wiper arm rod which exerts a first pressing force on the first element of the wiper arm rod facing the wiper arm head toward the vehicle window, and at least one second spring element arranged between the two elements of the wiper arm rod which exerts a second pressing force on the wiper blade acting toward the vehicle window.

4. The wiper arm arrangement according to claim 1, wherein:

the wiper arm rod is curved in design, the second element of the wiper arm rod facing the wiper blade is straight in design, and a section of the first element of the wiper arm rod connected with the wiper arm head is essentially arranged perpendicular to the second element of the wiper arm rod.

5. The wiper arm arrangement according to claim 1, wherein a section of the first element of the wiper arm rod connected with the second element of the wiper arm rod in an area of the second pivoting axis is aligned with the second element of the wiper arm rod, and that the first element of the wiper arm rod has an area curved by about 90°.

6. The wiper arm arrangement according to claim 5, wherein the wiper arm head is curved in design, and has two sections arranged at least approximately at about 90° relative to each other, and that one of the sections of the wiper arm head is connected with the drive shaft and is arranged at least essentially parallel to the second element of the wiper arm rod.

7. The wiper arm arrangement according to claim 1, wherein the arrangement is configured to clean spherically curved commercial vehicle windows.

* * * * *